UNITED STATES PATENT OFFICE.

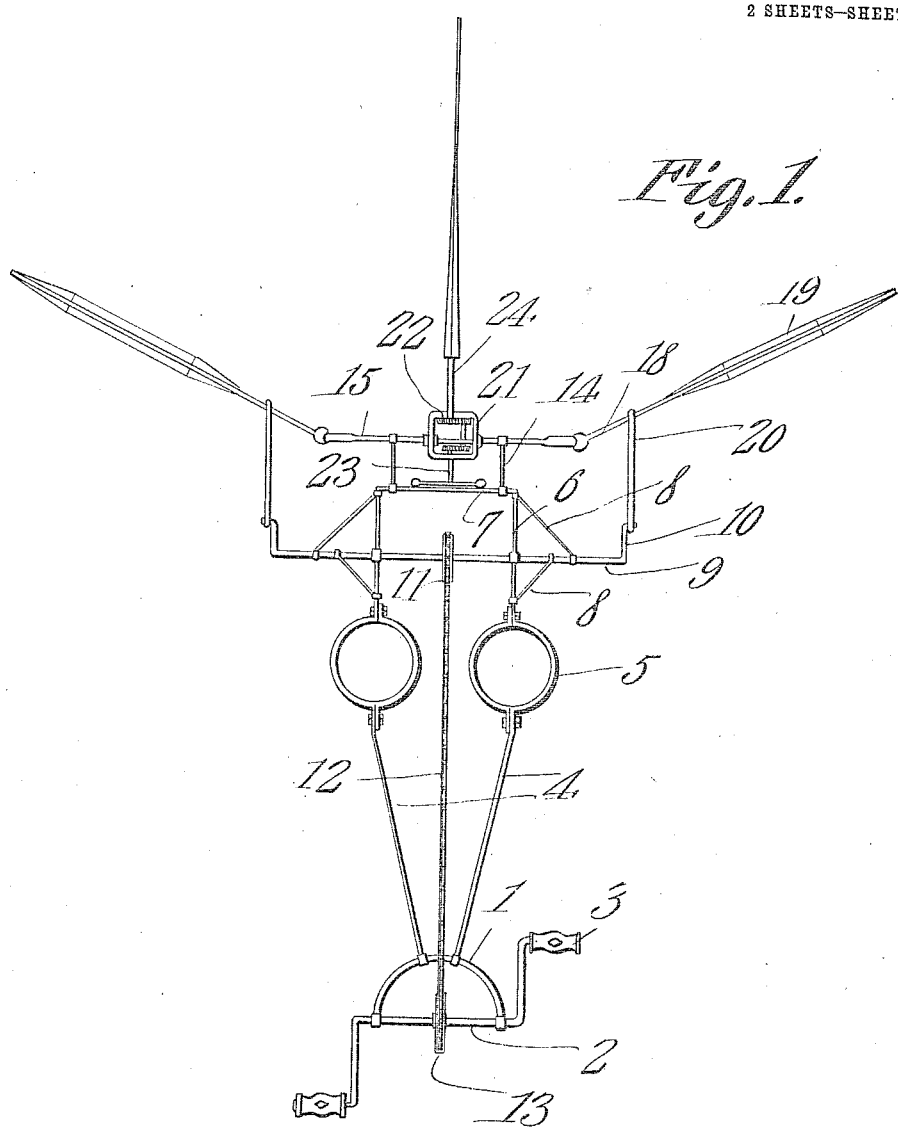

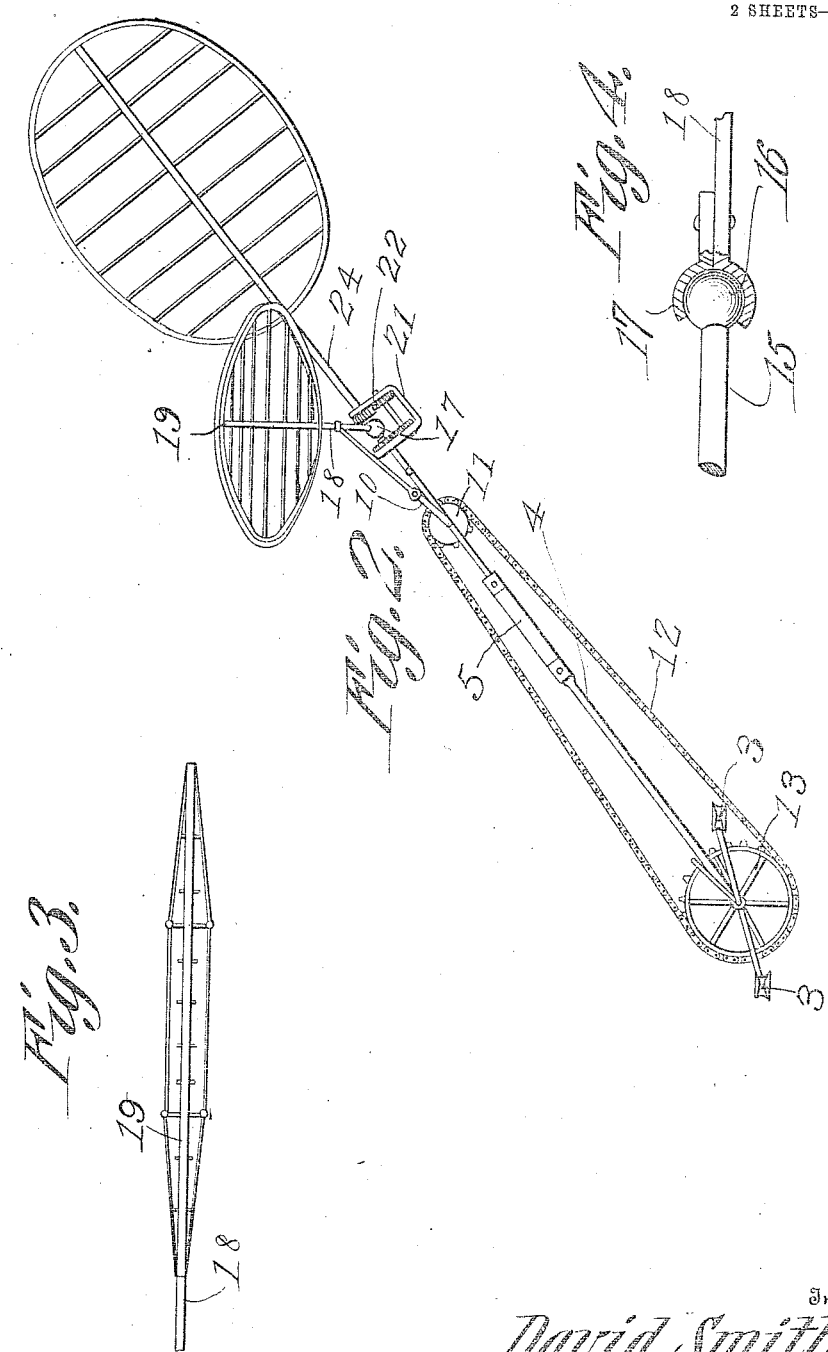

DAVID SMITH, OF DEVERRE, NEBRASKA.

FLYING-MACHINE.

985,849.

Specification of Letters Patent. Patented Mar. 7, 1911.

Application filed September 23, 1909. Serial No. 519,159.

*To all whom it may concern:*

Be it known that I, DAVID SMITH, a citizen of the United States, residing at Deverre, in the county of Garfield and State of Nebraska, have invented a new and useful Flying-Machine, of which the following is a specification.

This invention relates to flying machines and the object of the invention is to produce a machine in which the power will be supplied by the passenger and which may be easily propelled and will be of a simple construction.

The invention consists in certain novel features of the apparatus illustrated in the accompanying drawings as will be hereinafter first fully described and then pointed out in the appended claim.

In the drawings,—Figure 1 is a plan view of a flying machine constructed in accordance with my invention. Fig. 2 is an end elevation of the same, and Fig. 3 is an enlarged edge view of one of the wings or propeller planes. Fig. 4 is a detail view of the connection between the propeller plane or wing and the support for the same.

In carrying out my invention, I employ a skeleton frame constructed of light metal tubing and comprising an arched base portion 1, in the ends of which is journaled a crank shaft 2 provided at its ends with pedals 3. Rising from the said base portion 1 are diverging side bars 4 to the upper ends of which are secured the rings or circular rests 5 adapted to receive the legs of the operator. From the said rings or rests, standards 6 are projected and the upper ends of these standards are connected by a cross bar 7 so as impart rigidity to the frame. Within the standard 6 and in suitable bearings formed at the ends of the braces 8 extending outward from the standards, I journal a driven crank shaft 9 having crank arms 10 at its ends and provided at its center with a sprocket wheel 11 connected by a chain 12 with a driving sprocket wheel 13 on the driving crank shaft 2, as clearly shown. Short standards 14 rise from the cross bar 7 and in the upper or outer ends of the said standards 14 I secure a supporting rod 15 provided at its extremities with spherical enlargements or balls 16 around each of which are clamped the members of a socket 17 on the end of an arm 18 carrying a propelling wing or plane 19, as clearly shown.

The cover of each of the propelling wings may be of any suitable construction so as to offer the minimum amount of resistance during the upward movement of the wing, it being understood that the wing may be of the well known feathering type wherein flaps or strips are suspended from the frame and designed to swing upwardly and lap when the wing moves downwardly. However, inasmuch as the particular form of wing cover constitutes no part of the present invention it is to be understood that any suitable construction may be employed.

The arm 18 is connected by means of a pitman or link 20 with the crank arm 10 at the end of the shaft 9 so that the motion of the said shaft 9 will be imparted to the arm 18 and the wing or plane consequently rapidly vibrated so as to create a propelling and sustaining pressure against the atmosphere.

Upon the supporting rod 15, at about the center of the same, I secure a housing 21 within which a system of gearing 22 is mounted and upon the rear side of which a steering bar 23 is journaled, the said steering bar being disposed adjacent to the cross bar 7 whereby it may be easily grasped by the hands of the operator. In the front side of the housing 21 I mount a steering vane 24 which projects upwardly and forwardly from the said housing and the gearing 22 serves to connect the steering bar with the said vane whereby the rotation or oscillation of the steering bar will turn the steering vane to one side or the other so that the air striking against said vane in the flight of the machine will serve to deflect the machine to one side or the other and thereby cause the desired change in the direction of travel.

In using my improved flying machine, the passenger will assume an inclined position, as will be readily understood on reference to Fig. 2, with his legs passing through the supports or rings 5 and his feet bearing on the pedals 3. The machine will be supported at a sufficient height to permit the pedals to clear the ground and motion being imparted through the said pedals to the crank shaft 2, the sprocket wheel 13 will be rotated and the chain 12 will transmit the said motion to the sprocket wheel 11 and consequently rotate the crank shaft 9 whereby the wings 19 will be caused to follow the movement of the cranks 10 and consequently caused to press downward and backward against the atmosphere, the result of which action will be an uplifting and soaring of the machine. The sprocket wheels will be so proportioned as to cause the wings to vibrate at a very high speed so that the necessary sustaining and propelling pressure will be exerted by the same. When it is desired to travel straight ahead, the steering vane will be held in the position shown in Fig. 1 of the drawings, but if it is desired to move to one side or the other, the steering bar will be rotated so as to act on the steering vane through the gearing 22 and cause a similar rotation of said vane and cause the vane to lie in a plane at an angle to the central longitudinal plane of the machine and consequently deflect the machine to one or the other side.

My device is composed of very few parts so that it will have no excessive weight and the parts are so disposed as to possess the desired strength and the machine may be readily operated by any person.

Having thus described my invention, what I claim is:—

A machine of the class described including a frame adapted to be initially supported by the operator, wings carried by the frame, manually operated means upon the frame for simultaneously oscillating the wings in a plane receding upwardly from the frame, a steering vane having its axis of rotation alining with the longitudinal axis of the frame, said vane extending upwardly from the frame, and manually operated means for actuating the vane relative to the frame.

In testimony that I claim the foregoing as my own, I have hereto affixed my signature in the presence of two witnesses.

DAVID SMITH.

Witnesses:
CARL A. JOHNSON,
JOHN C. GREEN.